Figure 1:
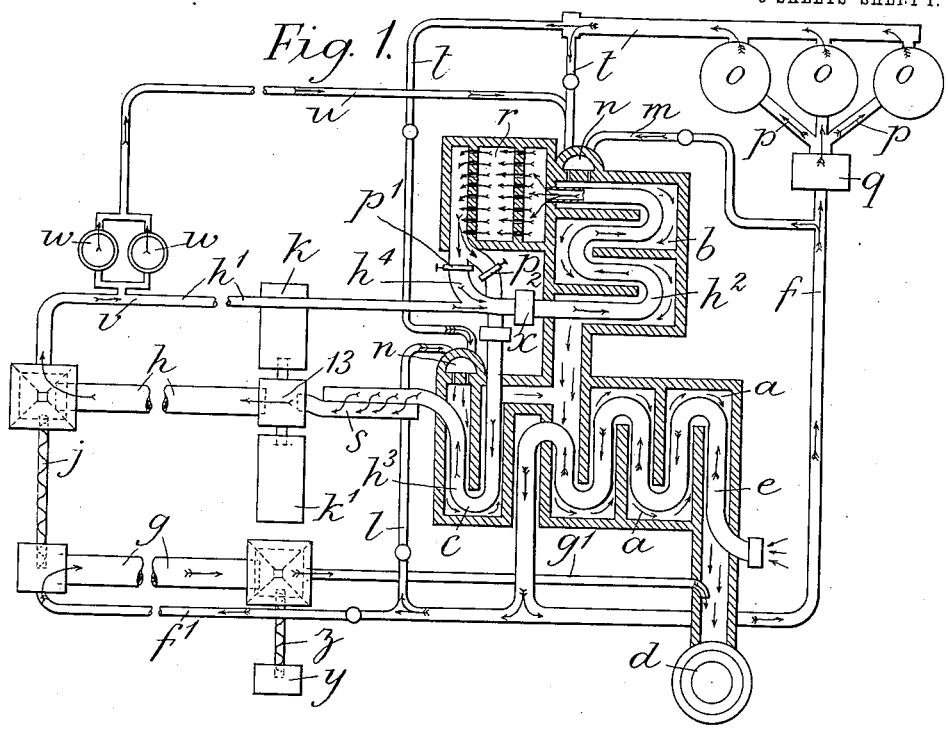

A. E. BOURCOUD.
MANUFACTURE OF IRON AND OTHER METALS.
APPLICATION FILED DEC. 27, 1910.

1,086,133.

Patented Feb. 3, 1914.

3 SHEETS—SHEET 1.

Witnesses.
Inventor
Augustin Emilio Bourcoud
By his Attorneys.

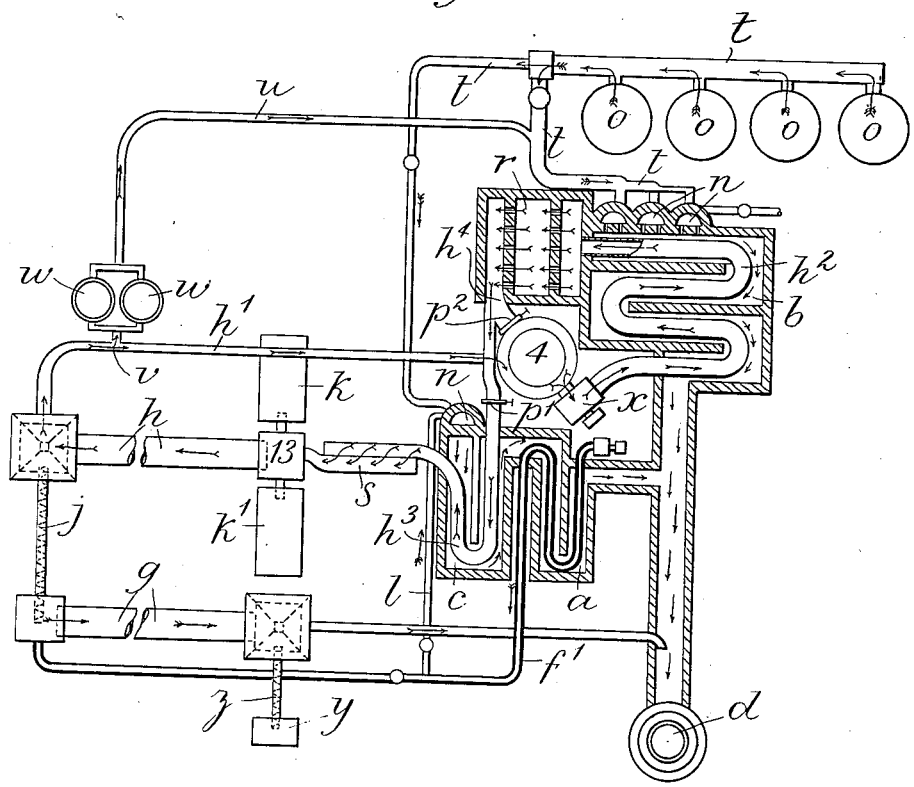

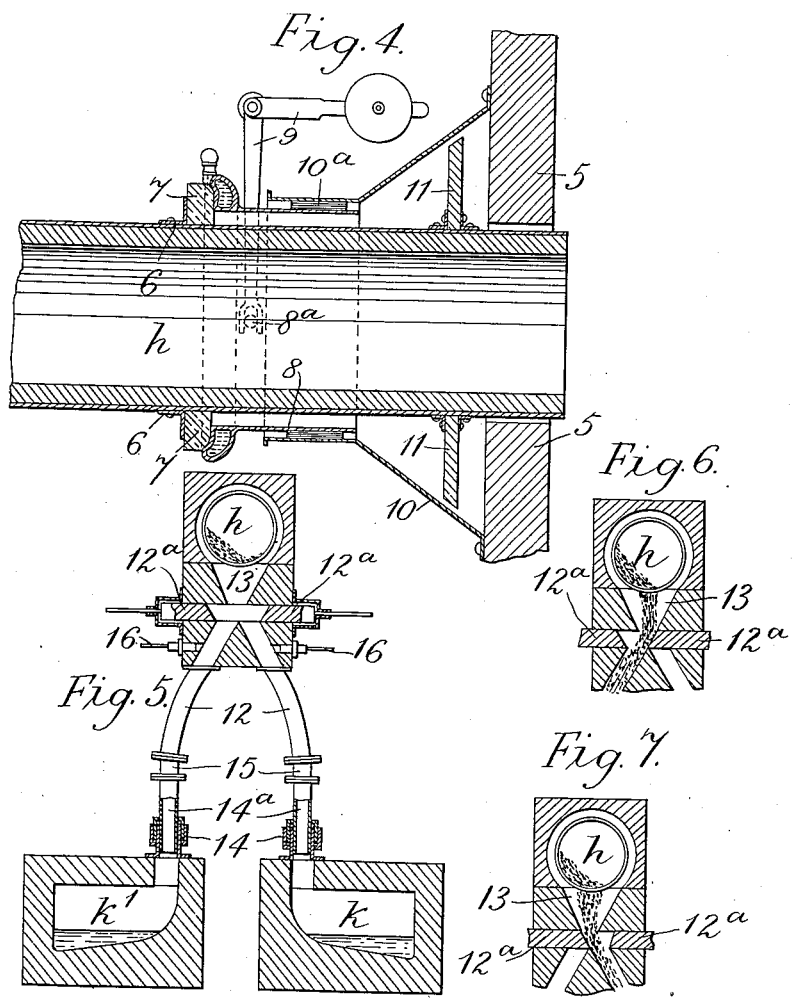

UNITED STATES PATENT OFFICE.

AUGUSTIN EMILIO BOURCOUD, OF LONDON, ENGLAND.

MANUFACTURE OF IRON AND OTHER METALS.

1,086,133.     Specification of Letters Patent.     Patented Feb. 3, 1914.

Application filed December 27, 1910. Serial No. 599,467.

*To all whom it may concern:*

Be it known that I, AUGUSTIN EMILIO BOURCOUD, a subject of the King of Spain, residing at London, England, have invented Improvements in and Relating to the Manufacture of Iron and other Metals, of which the following is a specification.

This invention relates to a closed cyclic process of the kind wherein metal is obtained from its ore by gaseous reducing agents, mainly carbonaceous, and resulting carbon dioxid is regenerated for re-use by incandescent carbon, the reduction process and the regenerative process taking place together in a closed cycle, or the regenerative process taking place separately in a closed and independent cycle, or the two processes taking place together in any desired proportionate rate so that the proportion of carbon dioxid mixed with the carbon monoxid constituting the reducing gas can be controlled to suit varying circumstances.

The present invention relates to improvements whereby greater economy, increased control and a purer product can be obtained.

The invention will be described mainly as applied to iron ores for which it is specially applicable. According thereto, instead of supplying the charge of ore and flux in comparatively large pieces to a shaft furnace and causing the reducing gas to flow through and among the whole mass of the charge as heretofore proposed, the charge of ore and flux is supplied in a comminuted or granular condition to and caused to travel slowly and with continuous agitation through the reducing zone of a reducing furnace, for example a rotary furnace, and the current of reducing gas, consisting mainly of carbon monoxid with a controlled amount of carbon dioxid, is caused to flow over and in contact with the continuously agitated stream of ore and flux, whereby the ore and flux and the reducing gas are brought into intimate contact and the ore reduced in an effective and comparatively quick manner. The reduced ore, gangue and flux are delivered into one or more melting furnaces, preferably electric furnaces, wherein they are melted and the metal separated and wherein the metal may, if desired, be further treated to modify its character.

The ore to be treated commonly contains various impurities, for examples compounds of phosphorus, sulfur, arsenic, manganese, chromium and silicon, and moisture and organic matter. The reducing gas also commonly contains hydrogen, or hydrogen yielding substances, or water, which, on decomposition, yields hydrogen, and also sulfur dioxid. Of these impurities it has been found that hydrogen in particular causes, whenever present in the circulating gas, serious complications in the metallurgical reactions that cannot be allowed for or foreseen. Again, at temperatures below 750° C. (seven hundred and fifty degrees centigrade), iron ore absorbs almost the whole of any sulfur present in the reducing gas, such sulfur mostly passing into the iron obtained instead of into the lime flux used. When both hydrogen and phosphoric acid are present, they are apt to first combine and afterward decompose, the phosphorus passing into the iron. On the other hand, mixtures of carbon monoxid and carbon dioxid that are free from hydrogen, exert no action on phosphorous compounds, or manganous oxid (MnO), or arsenates, or chromium oxids or silica. Furthermore, reactions between iron ores and pure mixtures of carbon monoxid and dioxid gases, in varying ratio and at different temperatures, and likewise between the said gases and incandescent carbon, can be separately plotted in advance by curves, so that any predetermined and desired result can be attained.

To avoid, as far as possible, the above mentioned disadvantages and to obtain the advantages set forth, moisture, organic matter or volatile impurities present in the charge to be treated are eliminated, as far as possible, by heating the charge with hot air, as in a rotary furnace, and delivering it dry, purified and hot to the reduction furnace. Hydrogen can be prevented from entering the reducing gas from the regenerator by feeding the latter with thoroughly dry and hot coke. In this way the reducing gas employed will be rendered free from and will be maintained free from hydrogen and the introduction of volatile impurities from the charge into the gas prevented. Any sulfur in the gas from the fuel can be eliminated, when necessary, before the gas reaches the charge, by sulfur extracting material.

The capacity of lime for removing sulfur from the hot gases increases with the temperature and is usefully applicable from 900° C. upward. At the said temperature for instance about 86% is removed, at 1000° C. about 92% and at 1100° C. about 94%. By effecting the treatment therefore in a part of the circuit where such temperatures prevail, metal containing very little sulfur as impurity can be obtained.

The reducing gas being free from hydrogen, oxidized foreign bodies in the charge not affected by carbon oxid gases alone, pass off in the slag, thus preventing useless expenditure of chemical energy besides avoiding impurity in the product. Should small quantities of sulfur have escaped elimination from the charge in the preheating furnace, the basic nature of the melting furnace treatment on the mixed spongy metal, flux and gangue will entirely remove such sulfur.

The plant employed for carrying out the improved process is arranged to economically satisfy the various heat requirements, and waste heat from one portion of the plant is utilized in another, so that the undermentioned features, which govern the nature of the results obtained, are under complete control, namely:—A. The composition and temperature of the gases and the temperature of the charge entering the reducing furnace; B. The volume of gas passed through the gas circulating conduit and the quantity of ore reduced per unit period; and C. The temperature and composition of the gas leaving the reducing furnace and which determine the treatment of the gas before it is again admitted to the reduction furnace.

Figure 2:
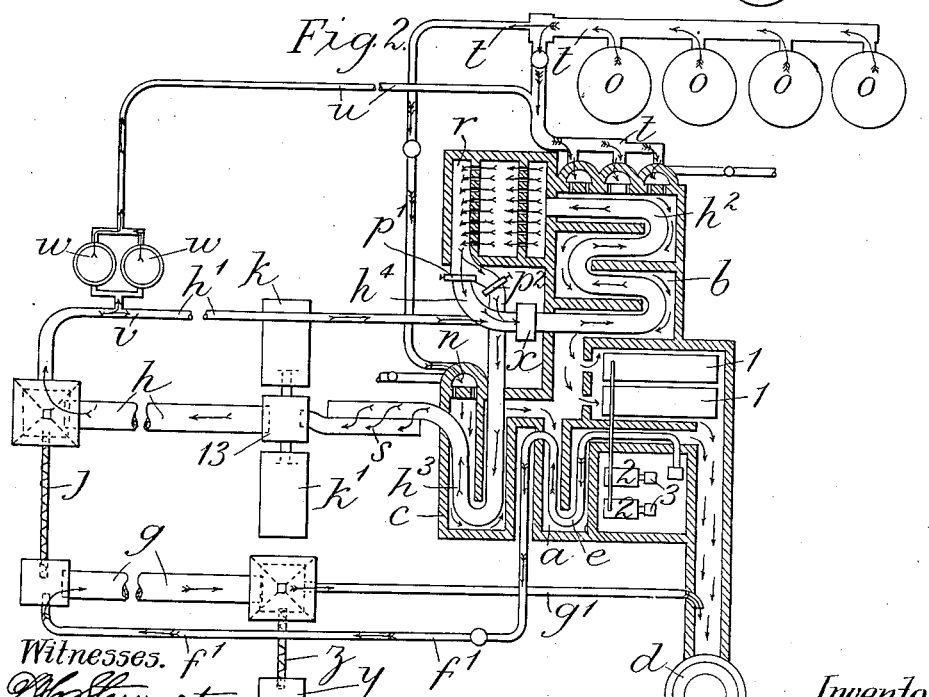

In the drawings Figure 1 shows diagrammatically, in plan, one arrangement according to the invention. Fig. 2 shows in plan a plant generally similar to that in Fig. 1 but with additional means for raising steam, driving engines 2 and generators 3. Fig. 3 is also a plan view wherein steam raising and utilizing means shown in Fig. 2 are substituted by a steam raising or air heating device. Fig. 4 is a vertical longitudinal section of a gas tight joint suitable for the ends of the rotary furnace. Figs. 5, 6 and 7 are vertical sections showing means for discharging the metal from the rotary reducing furnace and delivering it to the electric melting furnaces.

In Figs. 1, 2 and 3, $h$ and $r$ are respectively a long inclined rotary reducing furnace, and a coke regenerator which, together with pipes $h^1$, $h^2$, $h^3$ form a closed gas circulating conduit.

$b$ and $c$ are principal heating stoves arranged to respectively heat the gases before entering and after leaving the regenerator $r$.

$x$ is a gas circulating pump arranged between the pipes $h^1$ and $h^2$. An additional pump may, if desired, be placed between the regenerator $r$ and pipe $h^3$.

$h^4$ is a by-pass pipe with valves $p^1$ whereby the outlet of the regenerator can be connected to the inlet of the gas circulating device $x$.

$p^2$ is a controlling valve in the pipe $h^3$.

$s$ is a purifier forming part of the closed conduit and charged with material, for example lime or equivalent, for removing sulfur from the regenerated gas.

$g$ is an inclined rotary heater for preliminarily heating and purifying the charge.

$a$ is a supplementary stove containing an air heating pipe $e$; $o$ are gas producers, and $k$ $k^1$ electric furnaces. Combustible gas from the producers $o$ is led by valve controlled pipes $t$ through inlet chambers $n$ to, and burnt in, the stoves $b$ and $c$. The degree of heat attained can be controlled by varying the supply of air and gas to the stoves $b$ and $c$. A hopper $y$ and conveyer $z$ deliver ore and flux to the rotary heater $g$ and a conveyer $j$ delivers the treated charge to the reducing furnace $h$.

Singly feathered arrows indicate the path of the reducing gases, doubly feathered ones that of heated air, and triple feathered ones that of gases for combustion.

In Fig. 1, air drawn into the conduit $e$ is heated by products of combustion from the stoves $b$ and $c$, and divided into two main currents. One main current passes along a conduit $f$, part of it passing to the gas producers $o$ after first vaporizing water descending a coke or like tower $q$, the vapor and cooled air entering the producers $o$ through pipes $p$, thereby forming producer gas and water gas and avoiding clinker formation. The remaining portion of the said current of air passes through a valve controlled pipe $m$ and serves to burn producer gas in the stove $b$. The second main air current passes partly through a valve controlled pipe $l$ to burn producer gas in the stove $e$ and the remainder passes to the rotary heater $g$ through a pipe $f^1$ and thence through a pipe $g^1$ to a chimney $d$ or to the gas producers $o$.

In the closed reducing gas cycle, hot carbon monoxid, alone or mixed with carbon dioxid, is delivered to the lower end of the rotary reducing furnace $h$ and after use therein is, by the pump $x$ drawn from the furnace and delivered to the gas regenerator $r$. Thence the gas is either wholly delivered to the pipe $h^3$ in the heating stove $c$ and thence to the reducing furnace $h$, or wholly back to the regenerator through the pipe $h^2$, or some of it may be delivered direct to the furnace $h$ and the remainder caused to circulate, as long as required, through the pipes $h^4$, $h^2$ and the regenerator, according to the required degree of regeneration of the carbon monoxid and the relative proportions of it and the carbon dioxid in the gas to be redelivered to the reducing furnace. By the aid of the valves $p^1$ and $p^2$ such proportions can be fully controlled. Surplus gas, due to the reconversion of carbon dioxid into carbon monoxid, is removed at $v$ through gas holders $w$ and delivered through a pipe $u$ and utilized to supplement the combustible gases from the producers $o$.

In Fig. 2, the stove $a$ serves to heat air for preliminarily heating and purifying the charge only, the producers $o$ and principal heating stoves $b$ and $c$ receiving their air supply, heated or not, from some other source. Combustible gas in excess can be burnt in the principal stoves $b$, $c$ and some of the products of combustion can, as shown in Fig. 2, be utilized to raise steam in boilers 1 for generating electricity for the electric furnaces, such steam being used for example in turbines 2 driving dynamos 3.

Fig. 3 resembles Fig. 2 except that hot gas passing from the regenerator $r$ through pipe $h^4$ to pipe $h^2$ in stove $b$ is caused to raise steam in a boiler 4, or to heat air, which can be utilized as required, and the stove $c$ is supplied with air from pipe $f^1$.

Iron differs in allotropic condition according to the temperature employed in its reduction, and it is important to be able to obtain it in any one of such conditions, a result readily attainable by the present process. When the desired allotropic condition corresponds with a low temperature reduction, the second heating stove $c$ can be sometimes dispensed with, or not used.

Fig. 4 illustrates one of the gas tight joints between the ends of the rotary reducing furnaces $h$ and the stationary parts through which it passes. The furnace is provided with a flange 6 carrying a packing ring 7 of graphitic asbestos, for example, against which an endwise movable sleeve 8 is pressed by a weighted bell crank lever 9 engaging a pin $8^a$ on the sleeve. A housing 10 fixed to the wall 5 embraces the sleeve 8, a packing ring $10^a$ being arranged between the sleeve and housing, which are preferably protected from heat by a ring 11. The outer end of the sleeve 8 may, as shown, be water jacketed and provided with a lubricator. The housing 10 can also be jacketed.

Fig. 5 shows means for controlling the connection between the electric furnaces $k$, $k^1$ and reducing furnace $h$. Each furnace $k$, $k^1$ is connected by a pipe $14^a$ to a branch 12 leading from the discharge chamber 13 of the furnace $h$, such pipe being also connected, by a gas tight joint 14, to the corresponding electric furnace. Each electric furnace can, for convenience of discharging, be arranged to tilt. A detachable wedge shaped pipe 15 connects, in gas tight manner, adjacent ends of each pipe $14^a$ and branch 12, each branch having a valve 16 for placing it out of connection with the discharge chamber 13 for effecting repairs or any other purpose.

$12^a$ are slide valves of refractory material whereby the reduced charge can be directed to any electric furnace, of which there may be any desired number.

Two or more rotary reducing furnaces $h$ may be used and discharged into a common discharge chamber such as 13.

The operation of the apparatus, as illustrated in Fig. 1 and Figs. 4, 5, 6 and 7 is as follows:—Combustible gas generated in the producers $o$ is burnt, with the aid of air, at the stove inlets $n$ and after strongly heating the stoves and products of combustion is discharged into the chimney $d$. Air entering the inlet of the pipe or conduit $e$ is strongly heated in the stove $a$ and then divided into three currents one of which is used to supply the necessary air for the producers $o$, before delivery to which it is caused to evaporate water trickling down the tower $q$ and then to pass, mingled with such vapor, to the said producers. Another of the currents supplies the air necessary for the combustion at $n$, $n$ in the stoves of the gas from the producers $o$, $o$. The third current is delivered to the lower end of the inclined rotary heater $q$ and after passing therethrough discharged into the chimney. Such rotary heater is charged from the other end with the crude ore or crude ore and flux, which while passing therethrough in opposite direction to the air current frees such charge from moisture, organic matter and oxidizable material. The heated gases employed for reducing the ore are at high temperature and leave the reducing furnace cooled in proportion to the chemical work effected and richer in carbon dioxid but poorer in carbon monoxid. Any surplus gas having been withdrawn from circulation through the device 10, the gases are again highly heated to enable them to effect the endothermic reaction. $CO_2 + C = 2CO$ in the regenerator through which they are then passed. Since a single circulation may prove insufficient for the necessary carbon monoxid regeneration the gases can be wholly or partly re-circulated through the heating stove $b$ and regenerator. The sufficiently regenerated gas is then re-heated in stove $e$, deprived of sulfur from the coke in the device $s$ and again delivered to the reducing furnace and so on. It is to be observed concerning the preliminary treatment of the charge for reduction that since neither the air nor the gaseous products of its action can pass to the closed reducing cycle, it cannot render the gas in the reducing cycle impure, a most important feature. For effecting the reduction such charge, when preliminarily treated and while still hot, is delivered to the inclined rotary furnace $h$ of the aforesaid reducing cycle and passes therethrough, oppositely to the reducing gases whereby the iron is wholly reduced and discharged at 13 (as shown in Figs. 5 and 6) into and down the branch pipe 12 leading to the electric furnace $k^1$. After such furnace is charged the right-hand valve $12^a$ can be opened and the left-hand similar valve closed when the reduced charge will pass to the furnace $k$. Either furnace, when charged for instance, can be disconnected by closing the valve $12^a$ corresponding to the branch 12 of the particular furnace and afterward removing the corresponding short wedge shaped pipe 15 and pipe $14^a$. In Fig. 7 the reduction furnace is in communication with electric furnace $k$. The reducing gas should be prevented from circulating through the electric furnace or furnaces since its action is injurious, consequently the element of treating such mass, so as to protect it from the reducing gas, constitutes a material portion of the complete process. The reduced metal when melted will consist of pure or practically pure iron and can be removed as such or treated with other substance for conversion into steel or any special alloy.

What I claim is:—

1. A method of reducing metal from its ore consisting in causing the charge in a comminuted condition to flow with agitation through a reducing zone, causing a heated current of reducing gas to flow over the moving charge, withdrawing the reducing gas from the reduction zone, then re-heating it, passing it through a mass of incandescent carbon and strongly re-heating it from a source external to the cycle and delivering it to the reduction zone.

2. A method of reducing metal from its ore consisting in causing the charge in a comminuted condition to flow with agitation through a reducing zone, causing a heated current of reducing gas to flow over the moving charge, withdrawing the reducing gas from the reduction zone, passing it several times in succession through a mass of incandescent carbon, the gas being re-heated each time before passing through the incandescent carbon, and finally again delivering the gas to the reduction zone.

3. A method of reducing metal from its ore consisting in causing the charge in a comminuted condition to flow with agitation through a reducing zone, causing a heated current of reducing gas to flow over the moving charge, withdrawing the reducing gas from the reduction zone, passing it several times in succession through a mass of incandescent carbon, the gas being re-heated each time before passing through the incandescent carbon, and finally again heating and delivering the gas to the reduction zone.

4. A method of reducing metal from its ore consisting in causing the charge in a comminuted condition to flow with agitation through a reducing zone, causing a heated current of reducing gas to flow over the moving charge, withdrawing the reducing gas from the reduction zone, then re-heating it, passing it through a mass of incandescent carbon, heating a portion of the gas leaving the incandescent carbon and delivering it to the reduction zone and simultaneously heating the remaining portion of gas leaving the incandescent carbon and causing it to again flow through the incandescent carbon.

5. A method of reducing metal from its ore, consisting in causing the charge to flow in a comminuted condition and with agitation through a reducing zone, causing a heated current of carbon monoxid with a controllable amount of carbon dioxid to flow over said moving charge, then withdrawing the modified mixture of carbon monoxid and carbon dioxid from the reducing zone, causing the said mixture to circulate two or more times through a mass of incandescent carbon, thereby converting part of the carbon dioxid into carbon monoxid, the mixture being heated before each passage through the incandescent carbon and finally delivering the heated mixture of carbon monoxid and carbon dioxid to the reducing zone.

6. A method of reducing metal from its ore, consisting in causing the charge to flow in a comminuted condition and with agitation through a reducing zone, causing a heated current of carbon monoxid with a controllable amount of carbon dioxid to flow over said moving charge, then withdrawing the modified mixture of carbon monoxid and carbon dioxid from the reducing zone, heating the mixture and passing it through a mass of incandescent carbon, thereby converting part of the carbon dioxid into carbon monoxid, delivering a portion of the mixture direct to the reducing zone and over the moving charge, and causing the remainder of the mixture to circulate through the mass of incandescent carbon, such portion of the mixture being re-heated before each passage through the carbon.

7. A method of reducing metal from its ore, consisting in causing the charge to flow in a comminuted condition and with agitation through a reducing zone, causing a heated current of carbon monoxid with a controllable amount of carbon dioxid to flow over said moving charge, then withdrawing the modified mixture of carbon monoxid and carbon dioxid from the reducing zone, heating the mixture and passing it through a mass of incandescent carbon, thereby converting part of the carbon dioxid into carbon monoxid, heating a portion of the gas leaving the incandescent carbon and delivering it to the reduction zone and over the moving charge, and causing the remainder of the mixture to circulate through the mass of incandescent carbon, such portion of the mixture being re-heated before each passage through the carbon.

8. A method of reducing metal from its ore, consisting in causing the charge to flow in a comminuted condition and with agitation through a reducing zone, causing a heated current of carbon monoxid with a controllable amount of carbon monoxid but substantially free and maintained free from hydrogen substance to flow over said moving charge, withdrawing the gaseous current from the reducing zone, reheating the gaseous current, regenerating carbon monoxid from carbon dioxid present therein by passage through incandescent carbon and afterward returning the resulting mixture of carbon monoxid and carbon dioxid to the reducing zone for re-use.

9. A method of reducing metal from its ore consisting in causing the charge in a finely divided condition and with agitation to successively pass through a zone rendered strongly oxidizing by a strongly heated current of substantially pure air and another zone comprising a current of heated reducing gas and controlling the path of the gases in each of said zones so that those of the said oxidizing zone cannot at any point mingle with those of the said reducing zone, and regenerating the gas leaving the reducing zone for re-use.

10. A method of reducing metal from its ore, consisting in causing the charge to flow in a comminuted condition through a reducing zone, causing a heated current of reducing gas to flow continuously over said moving charge, re-heating the gas after leaving the reducing zone, passing it through a mass of incandescent carbon, removing sulfur from the resulting gas by subjecting it to the action of lime in a part of the circuit at high temperature as set forth and afterward again delivering the gas to the reducing zone for re-use.

11. A method of reducing metal from its ore, consisting in causing the charge to flow in a comminuted condition through a reducing zone, causing a heated current of reducing gas to flow continuously over said moving charge, re-heating the gas after leaving the reducing zone, passing it through a mass of incandescent carbon, removing sulfur from the resulting gas by subjecting it to the action of lime in a part of the circuit at high temperature as set forth, reheating the gas and afterward again delivering it to the reducing zone for re-use.

Signed at London, England, this 16th day of December, 1910.

AUGUSTIN EMILIO BOURCOUD.

Witnesses:
WILLIAM PETERSON,
H. D. JAMESON.